US005253405A

United States Patent [19]

Carroll

[11] Patent Number: 5,253,405

[45] Date of Patent: Oct. 19, 1993

[54] LANTERN RING REMOVAL TOOL

[76] Inventor: James L. Carroll, 5 E. Yacht Dr., Long Beach, N.C. 28456

[21] Appl. No.: 936,670

[22] Filed: Aug. 28, 1992

[51] Int. Cl.[5] .............................................. B23P 19/00

[52] U.S. Cl. ...................................... 29/213.1; 29/269

[58] Field of Search ............... 29/213.1, 219, 256-266, 29/282

[56] References Cited

U.S. PATENT DOCUMENTS

| | | | |
|---|---|---|---|
| 1,865,420 | 6/1932 | Kick | 29/264 |
| 3,711,920 | 1/1973 | Simmons | 269/43 |
| 3,990,139 | 11/1976 | Touchet | 29/261 |
| 4,034,458 | 7/1977 | Ford et al. | 29/259 |
| 4,287,653 | 9/1981 | Bloch | 29/256 |
| 4,929,111 | 5/1990 | Lavitano | 29/264 |

*Primary Examiner*—Robert C. Watson
*Attorney, Agent, or Firm*—Rhodes, Coats & Bennett

[57] ABSTRACT

An apparatus for removing a stuck lantern ring from the packing chamber of a valve assembly. The apparatus includes a guide collar which can be fixedly secured to the valve stem at a position above the packing chamber. The guide collar includes a plurality of equally spaced guide holes for guiding a drilling instrument used to form threaded openings in the lantern ring. After the holes are formed in the stuck lantern ring, thread connectors are inserted through the guide holes in the guide collar and are engaged with the threaded holes in the lantern ring. When the valve stem is raised, the removal tool applies a lifting force to the stuck lantern ring to lift the lantern ring out of the packing chamber.

15 Claims, 5 Drawing Sheets

LANTERN RING REMOVAL TOOL

FIELD OF THE INVENTION

The present invention relates generally to a tool for use in disassembling a valve assembly, and more particularly to a tool and method for removing a stuck lantern ring from the packing chamber of a valve assembly.

BACKGROUND OF THE INVENTION

The routine maintenance of valves usually includes the periodic removal and replacement of packing materials around the valve stem. The packing materials are disposed around the valve stem and are located in a chamber in the valve bonnet. The packing material will sometimes include a lantern ring which is disposed between upper and lower portions of the packing material. The lantern ring is a metal ring having a plurality of radial conduits. The radial conduits of the lantern ring are aligned with a lubrication port extending through the wall of the bonnet into the packing chamber.

In some circumstances, the lantern ring will become stuck making it difficult to remove. To remove a stuck lantern ring, the mechanic usually uses a drill to form a series of circumferentially spaced holes on the lantern ring which are then tapped and threaded with a series of bolts. The bolts are pulled manually to lift the lantern ring out of the packing chamber.

This method of removing a stuck lantern ring has numerous drawbacks. It is difficult at best to insert a drill into a packing chamber without damaging the highly polished surfaces of the packing chamber and/or valve stem. Damage to those surfaces may result in the failure of the packing to provide a complete seal around the valve stem.

Various types of tools have been devised in the past for disassembling a valve. Such tools are disclosed in the patent to Fennema, U.S. Pat. No. 2,641,052; Fisher, U.S. Pat. No. 2,649,825; Boler, U.S. Pat. No. 1,934,255; and Sutton et al., U.S. Pat. No. 4,079,494. None of these references, however, disclose a tool for removing a stuck lantern ring from the packing chamber of a valve bonnet.

SUMMARY AND OBJECTS OF THE INVENTION

The present invention is a lantern ring removal tool for removing a stuck lantern ring from the packing chamber of a valve bonnet. The lantern ring removal tool attaches to the valve stem of the valve assembly which is used to apply the lifting force to lift the stuck lantern ring from the packing chamber.

The lantern ring removal tool includes a split ring guide collar which is disposed around the valve stem at a point above the packing chamber in the valve bonnet. The guide collar includes a series of guide holes which are equally spaced about the circumference of the collar. A drill extension passes through the guide holes in the collar and is used to drill and tap the lantern rings. Bolts are then passed through the guide holes and the collar and screwed into the lantern ring. The lantern ring can then be lifted out of the packing chamber by turning the valve stem to raise the collar. As the collar is raised, the lifting force is applied to the lantern ring through the bolts. This lifting force is applied equally around the circumference of the lantern ring, thus permitting the lantern ring to be removed without damage to the valve stem or packing chamber.

Accordingly, it is primary object of the present invention to provide a tool for removing a stuck lantern ring from the packing chamber of the valve bonnet.

Another object of the present invention is to provide a lantern ring removal tool which utilizes the valve stem to apply the lifting force to remove the lantern ring.

Still another object of the present invention is to provide a lantern ring removal tool which can be used with virtually any existing valve assembly.

Another object of the present invention is to provide a lantern ring remove tool which substantially reduces the amount of time needed to make repairs to the valve assembly and to replace the valve packing therein.

Still another object of the present invention is to provide a lantern ring removal tool for a valve assembly which enables a stuck lantern ring to be removed without damaging the highly polished surface of the valve stem and the packing chamber.

Other objects and advantages of the present invention will become apparent and obvious from a study of the following description and the accompanying drawings which are merely illustrative of such invention.

BRIEF DESCRIPTION OF THE DRAWINGS

FIG. 2 is an exploded perspective view of the lantern ring removal tool of the present invention;

DETAILED DESCRIPTION OF THE INVENTION

Figure 1:
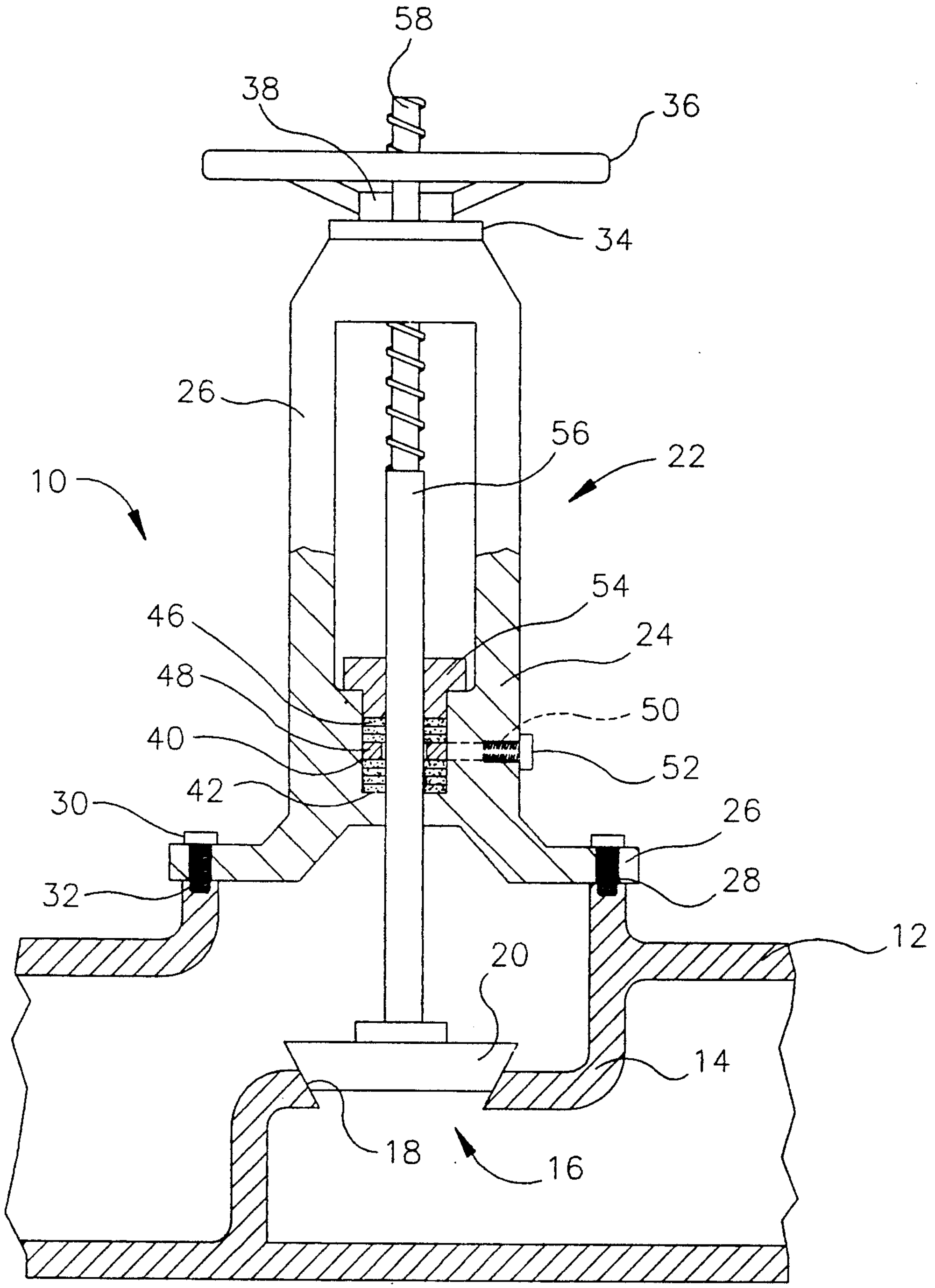

Referring now to the drawings and particularly to FIG. 1, there is shown a typical valve assembly which is indicated generally by the numeral 10. The valve assembly 10 includes a valve body 12 defining a fluid chamber. The fluid chamber is divided by a partition 14 having an opening therein. The opening 16 is surrounded by a conical valve seat 18 which is formed in the partition 14. The valve seat 18 is engageable with a valve 20 which is mounted at one end of a valve stem 56. When the valve stem 56 is lowered, the valve 20 is brought into engagement with the valve seat 18 to stop the fluid flow through the fluid chamber. Conversely, when the valve stem 56 is raised, the valve 20 is brought out of engagement with the valve seat 18 thereby opening the fluid chamber.

A bonnet indicated generally at 22 is mounted on top of the valve body 12. The bonnet 22 includes a base portion 24 and a yoke 26. The base portion 24 includes an outwardly projecting flange 26 having a series of openings 28 formed therein. The bonnet 22 is secured to the valve body 12 by bolts 30 which pass through the openings 28 in the flange and threadably engage corresponding bolt holes 32 in the valve body 12.

The yoke 26 extends upwardly from the base portion 24 and has a bushing 34 mounted at the upper end thereof. A hand crank 36 is rotatably journalled in the bushing 34. The hand crank 36 includes a hub 38 having a threaded opening (not shown). An upper end portion 58 of the valve stem 56 is threadably engaged in the hub 38 of the hand crank 36. When the hand crank 36 is rotated in a counter-clockwise direction, the valve stem 56 is raised thereby opening the valve 20. When the hand crank 36 is rotated in a clockwise direction, the valve stem 56 is lowered until the valve 20 makes contact with the valve seat 18.

A cylindrical packing chamber 40 is formed in the base portion 24 of the bonnet 22. The bottom 42 of the packing chamber 40 includes an opening 44 through which the valve stem 56 extends. The side walls of the opening 44 serve as a guide to keep the valve stem 36 aligned. Valve packing 46 is disposed around the intermediate portion of the valve stem 56 within the packing chamber 40. The valve packing 46 typically consists of several annular rings of packing material such as graph foil ribbon, graphite impregnated asbestos fiber, wire reinforced packing rings, or other suitable materials. A metal lantern ring 48 is disposed in the packing chamber between upper and lower portions of the valve packing 46. Lantern ring 48 has a plurality of radial conduits (not shown) extending inwardly from the outer circumference of the lantern ring 48 to its outer circumference. The lantern ring 48 is mounted in the packing chamber with the radial conduits aligned with a fluid port 50 extending through the wall of the bonnet 22 into the packing chamber 40. The fluid port 50 is threaded at its outer end for engagement with a plug 52.

The entire packing assembly is retained in the packing chamber 40 by a packing gland 54. The packing gland 54 typically includes an apertured flange through which a pair of swing bolts mounted on the bonnet 22 extend. Nuts are threaded onto the ends of the swing bolts to tighten the packing gland 54 down against the packing assembly. The construction of the packing gland 54 is entirely conventional and is well known to those skilled in the art.

To maintain the valve assembly in proper working order, it is necessary to periodically remove and replace the packing assembly from the packing chamber 40. Replacement of the packing assembly, however, can be made difficult by a stuck lantern ring 48. The lantern ring removal tool of the present invention has been devised to make the task of removing a stuck lantern ring less difficult.

Figure 2:
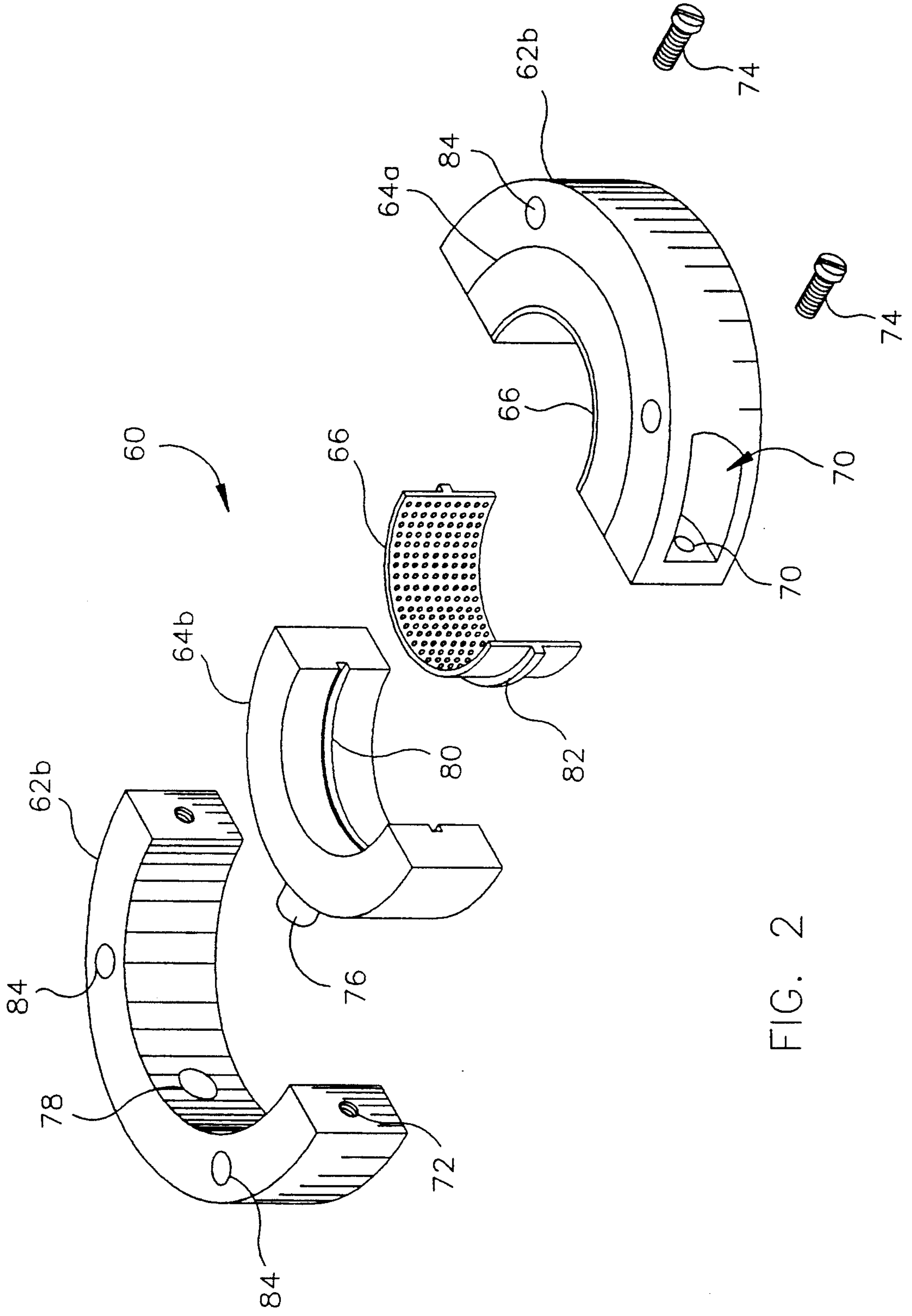
FIG. 2 is a partial section view of a typical valve assembly.
Figure 3:
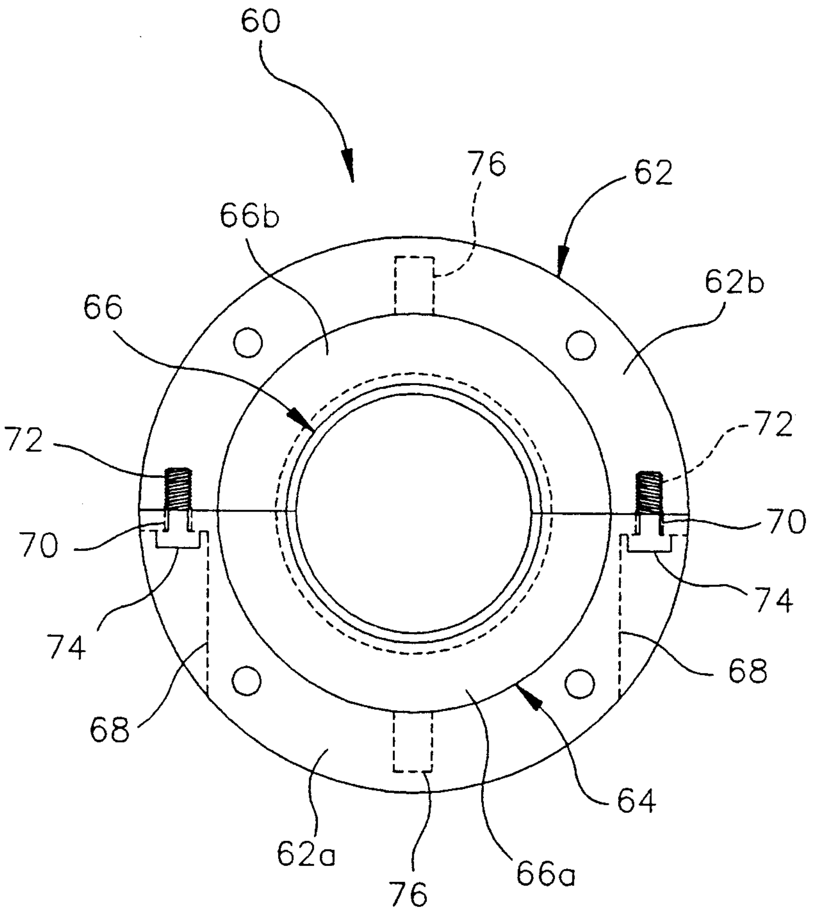
FIG. 3 is a top plan view of the lantern ring removal tool of the present invention.

Referring now to FIG. 2, an exploded perspective view of the removal tool is shown. The main components of the removal tool are a lifting member which is mountable on the valve stem 56, and a plurality of lifting rods. The lifting rods extend downwardly from the lifting member to engage the lantern ring. When the valve stem 56 is raised, a lifting force is applied by the lifting member and lifting rods to the stuck lantern ring to lift the lantern ring from the packing chamber 40.

The lifting member in a preferred embodiment consists of a split ring, guide collar assembly 60. The guide collar assembly 60 includes an outer guide collar 62, an inner adapter ring 64, and a gripping pad 66.

The guide collar 62 includes two semi-circular guide ring portions **62*a* and 62*b*. One of the guide ring portions 62*a* is formed with a pair of recesses 68 disposed closely adjacent to respective ends of the guide ring portions 62*a* and 62*b*. A pair of clearance holes 70 extend from the end of the ring portion 62*a* to the recess 68. The opposite ring portion 62*b* includes a pair of threaded holes 72 which align with respective clearance holes 70 in the first ring portion 62*a*. A pair of clamping screws 74 are inserted through respective clearance holes 70 in the first ring portion 62*a* and are threaded into the threaded hole 72 in the second ring portion 62*b*. The function of the clamping screw 74 is to draw the guide ring portions 62*a* and 62*b* together around the valve stem 56 to secure the guide collar 62 to the valve stem 56**.

A series of circumferentially spaced guide holes 84 are formed in the guide ring 64. One of the purposes of the guide holes 84, which are equally spaced, is to guide a drilling instrument used to form threaded openings in the lantern ring 48. The remaining purposes of the guide holes 84 will become apparent below.

The adapter ring 64 is sized to fit inside the guide ring 62. That is, the outside diameter of the adapter ring 64 is approximately equal to the inside diameter of the guide ring 62. The inside diameter of the adapter ring 64 should be slightly larger than the diameter of the valve stem to accommodate the gripping pad 66. The adapter ring 64 consists of two semi-circular, half-ring portions **64*a* and 64*b*. Each half-ring portion, 64*a* and 64*b*, includes a locating pin 76 which projects radially from its outer circumference. The locating pin 76 fits into a locating hole 78 on the inner surface of the guide collar 62 to locate the adapter ring portions 64*a* and 64*b* with respect to the guide ring portions 62*a* and 62*b*. The purpose of the adapter ring 64 is to allow the guide collar assembly 60 to be used with different valve assemblies having valve stems varying in diameter. The same guide collar 62** can be used by simply substituting one adapter ring set for a differently sized adapter ring set.

The gripping pads 66 mount to the inner surface of the adapter ring 64. The pad 66 is made of a material which provides a relatively high coefficient of friction with the valve stem 56, such as rubber. To facilitate mounting of the gripping pad 66, the inner surface of the adapter rings **64*a* and 64*b* are formed with a circumferentially extending groove 80. A tongue 82 is formed on the back of the gripping pad 66 which is shaped to fit into the groove 80 in the adapter ring portions 64*a* and 64*b*. The tongue 82 prevents the gripping pad 66 from slipping out of the guide collar assembly 60 during use. The inner surface of the gripping pad 66 is textured to provide a firm, non-slip grip on the valve stem 56**.

The lifting rods consist of a threaded connector 86, such as a hex head bolt. The threaded connector 86 includes threads at one end thereof and has a head at the opposite end. The threaded connectors are insertable through the openings 84 to the guide collar 62 until the head makes contact with a top surface of the guide collar 62. The threaded end of the threaded connectors are threadably engaged with the threaded holes in the lantern ring 48.

In use, the guide collar assembly 60 is secured to the valve stem 56 at a point above the packing chamber 40. An adapter ring 64 of the appropriate size is selected and fitted inside the guide collar 62. The gripping pad 66 is secured to the inner surface of the adapter ring 64 by inserting the tongue 82 into the groove 80 on the adapter ring 66. The two halves of the guide collar assembly 60 are then disposed around the valve stem 56. The clamping screws 74 are inserted through the clearance holes 70 in the first half of the guide ring 62 and are threaded into the threaded holes 72 of the second half of the guide ring 62. When the clamping screws 74 are tightened, the two halves of the guide ring 62 are pulled together to clamp the guide collar assembly 60 onto the valve stem 56.

Figure 4A:
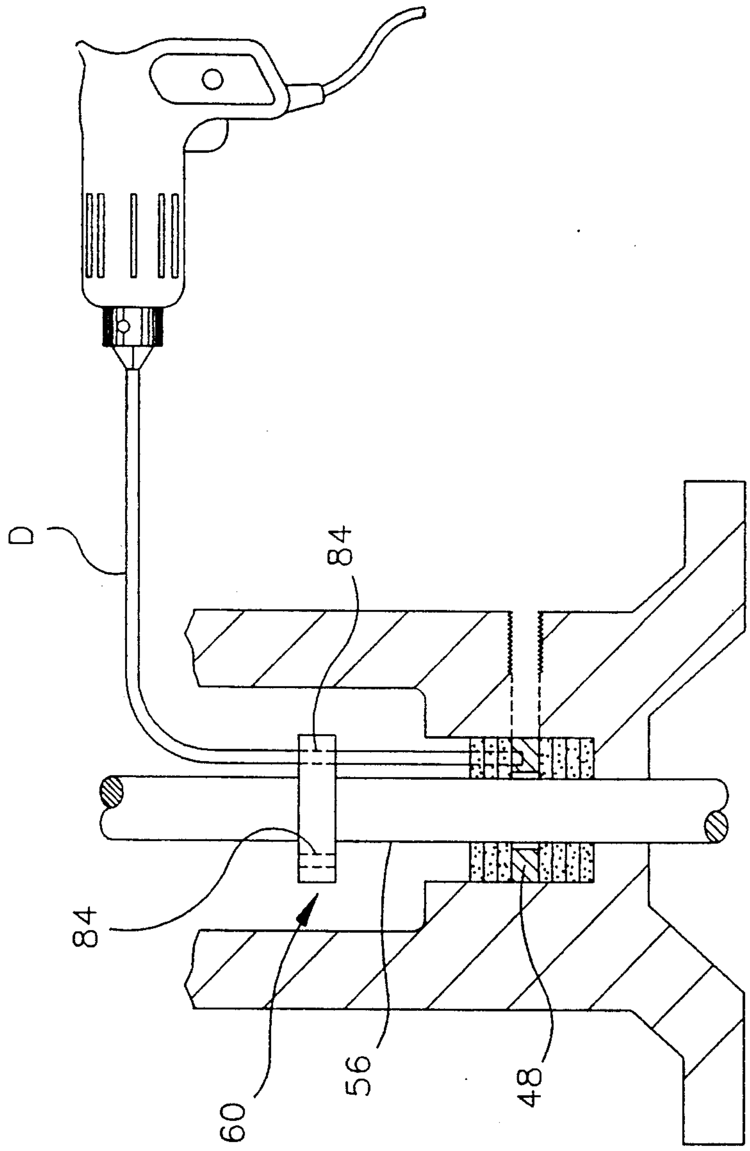
FIG. 4A is a partial section view of a valve assembly illustrating the use of the lantern ring removal tool during the drilling step.

With the guide collar assembly 60 securely clamped in place on the valve stem 56, the extension of a directional drilling instrument can be inserted through the guide holes 84 on the guide ring 62. Using the directional drilling instrument, the lantern ring 48 is drilled and tapped as shown in FIG. 4A to form a threaded hole in the lantern ring 48. This process is repeated for each of the holes 84 in the guide rings 62.

Figure 4B:
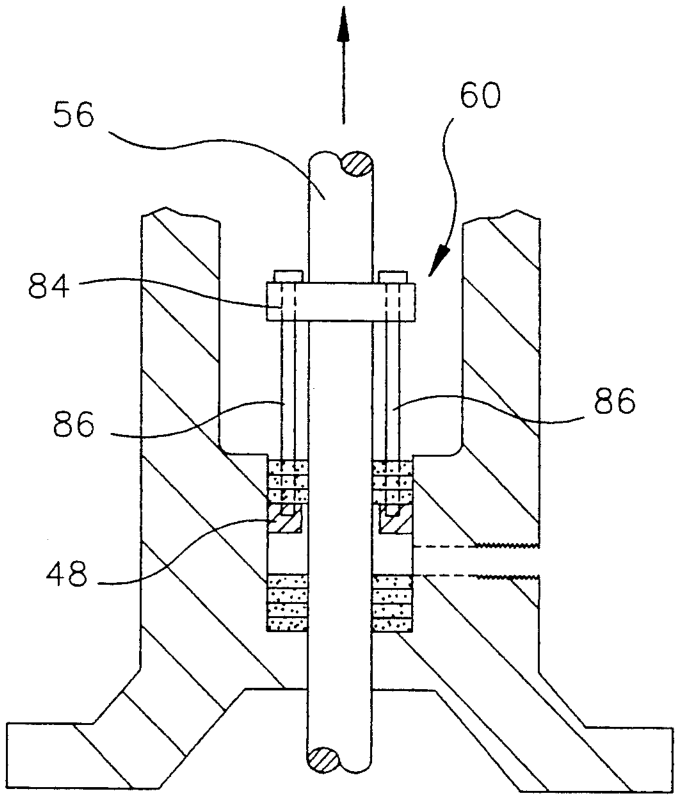
FIG. 4B is a partial section view of the valve assembly showing the use of the lantern ring removal tool to lift the lantern ring from the packing chamber.

Once the lantern ring 48 is drilled and tapped, a plurality of threaded connectors 86, such as a hex-head bolt, are inserted through the guide holes 84 in the guide rings 62 and are threadably engaged with the holes formed in the lantern ring 48 as shown in FIG. 4B. The lantern ring 48 can then be lifted out of the packing chamber 40 by raising the valve stem 56. As the valve stem 56 is raised, the threaded connectors 86 apply a lifting force to the lantern ring 48. Since the threaded connectors 86 are equally spaced the lifting force applied to the lantern ring 48 is equally distributed, which limits twisting of the lantern ring 48 and makes removal easier.

Based on the foregoing, it is apparent that the lantern ring removal tool of the present invention provides an easy and convenient method for removing a stuck lantern ring from the packing chamber of a valve assembly. The removal tool prevents damage to the surfaces of the packing chamber and valve stem and greatly reduces the time needed to remove and replace the packing material.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

We claim:

1. A tool for removing a stuck lantern ring from the packing chamber of a valve assembly including a valve stem, comprising:

(a) a guide ring;

(b) means for mounting the guide ring to the valve stem at a position above the packing chamber, the means for mounting the guide ring includes an adapter ring insertable inside the guide ring, wherein the outside diameter of the adapter ring is approximately equal to the inside diameter of the guide ring, and wherein the inside diameter of the adapter ring is approximately equal to the outside diameter of the valve stem;

(c) a plurality of guide holes formed in the guide ring for guiding a drilling instrument used to form threaded openings in the lantern ring; and (d) a plurality of lifting rods insertable through the guide holes in the guide ring and extending generally parallel to the valve stem, said lifting rods being engageable with the stuck lantern ring for lifting the stuck lantern ring from the packing chamber when the valve stem is raised.

2. The lantern ring removal tool of claim 1 wherein the adapter ring includes a projection extending from the outer circumference thereof, and wherein the guide ring includes a recess adapted to receive the projection of the adapter ring for retaining the adapter ring within the guide collar.

3. The lantern ring removal tool of claim 1 further including a resilient gripping pad detachably mounted to the inside diameter of the adapter ring.

4. The lantern ring removal tool of claim 3 wherein the gripping pad includes a circumferentially extending tongue, and wherein the adapter ring includes a circumferentially extending groove adapted to receive the tongue of the gripping pad to retain the gripping pad within the adapter ring.

5. The lantern ring removal tool of claim 1 wherein the guide ring comprises two semi-circular ring portions adapted to be disposed on opposite sides of the valve stem, wherein the mounting means includes screw means for drawing the two ring portions together around the valve stem.

6. In combination, a valve tool and valve where the valve comprises a valve stem, means for raising the valve stem, and a lantern ring and packing material located within a packing chamber and disposed about the valve stem, and wherein the valve tool comprises:

(a) a ring-like guide member disposed around the valve stem;

(b) a plurality of guide holes formed in the guide member; and (c) a plurality of lifting rods insertable through the guide holes in the guide member, each said lifting rod including means for engaging the lantern ring wherein the lantern ring is removable from the packing chamber by engaging the lifting rods with the lantern ring and raising the lifting rods.

7. The lantern ring removal tool of claim 6 wherein the guide member is fixedly secured to the valve stem.

8. The lantern ring removal tool of claim 6 wherein the guide member includes a first section and a second section, and wherein the mounting means includes clamping means for clamping the first and second sections of the guide member together in a secured position around the valve stem.

9. The lantern ring removal tool of claim 8 wherein first and second sections of the guide member are semi-circular ring portions adapted to be disposed on opposite sides of the valve stem, and the clamping means includes a screw means for pulling the first and second sections together.

10. In combination, a valve tool and valve where the valve comprises a valve stem, means for raising the valve stem, and a lantern ring and packing material located within a packing chamber and disposed about the valve stem, and wherein the valve tool comprises:

(a) a guide ring including a top surface;

(b) clamping means for mounting the guide ring to the valve stem at a position above the packing chamber so that the guide ring is moveable with the valve stem;

(c) a plurality of guide holes formed in the guide ring;

(d) a plurality of lifting rods having upper and lower ends insertable through the guide holes in the guide ring and extending generally parallel to the valve stem;

(e) stop means secured at an upper end of each lifting rod for engagement with the top surface of the guide ring such that an upwardly directed lifting force is applied to the lifting rod by the guide ring when the valve stem is raised; and (f) securing means formed at the lower end of the lifting rods for securing the lifting rod to the lantern ring so that the lantern ring is pulled upwardly from the packing chamber when the valve stem is raised.

11. The combination valve tool and valve of claim 10 wherein the means for mounting the guide ring includes an adapter ring insertable inside the guide ring, wherein the outside diameter of the adapter ring is approximately equal to the inside diameter of the guide ring, and wherein the inside diameter of the adapter ring is approximately equal to the outside diameter of the valve stem.

12. The combination valve tool and valve of claim 11 wherein the adapter ring includes a projection extending from the outer circumference thereof, and wherein the guide ring includes a recess adapted to receive the projection of the adapter ring for retaining the adapter ring within the guide collar.

13. The combination valve tool and valve of claim 12 further including a resilient gripping pad detachably mounted to the inside diameter of the adapter ring.

14. The combination valve tool and valve of claim 13 wherein the gripping pad includes a circumferentially extending tongue, and wherein the adapter ring includes a circumferentially extending groove adapted to receive the tongue of the gripping pad to retain the gripping pad within the adapter ring.

15. The combination valve tool and valve of claim 10 wherein the guide ring comprises two semi-circular ring portions adapted to be disposed on opposite sides of the valve stem, and the clamping ring includes screw means for folding the two half ring portions together.

* * * * *